Patented May 23, 1944

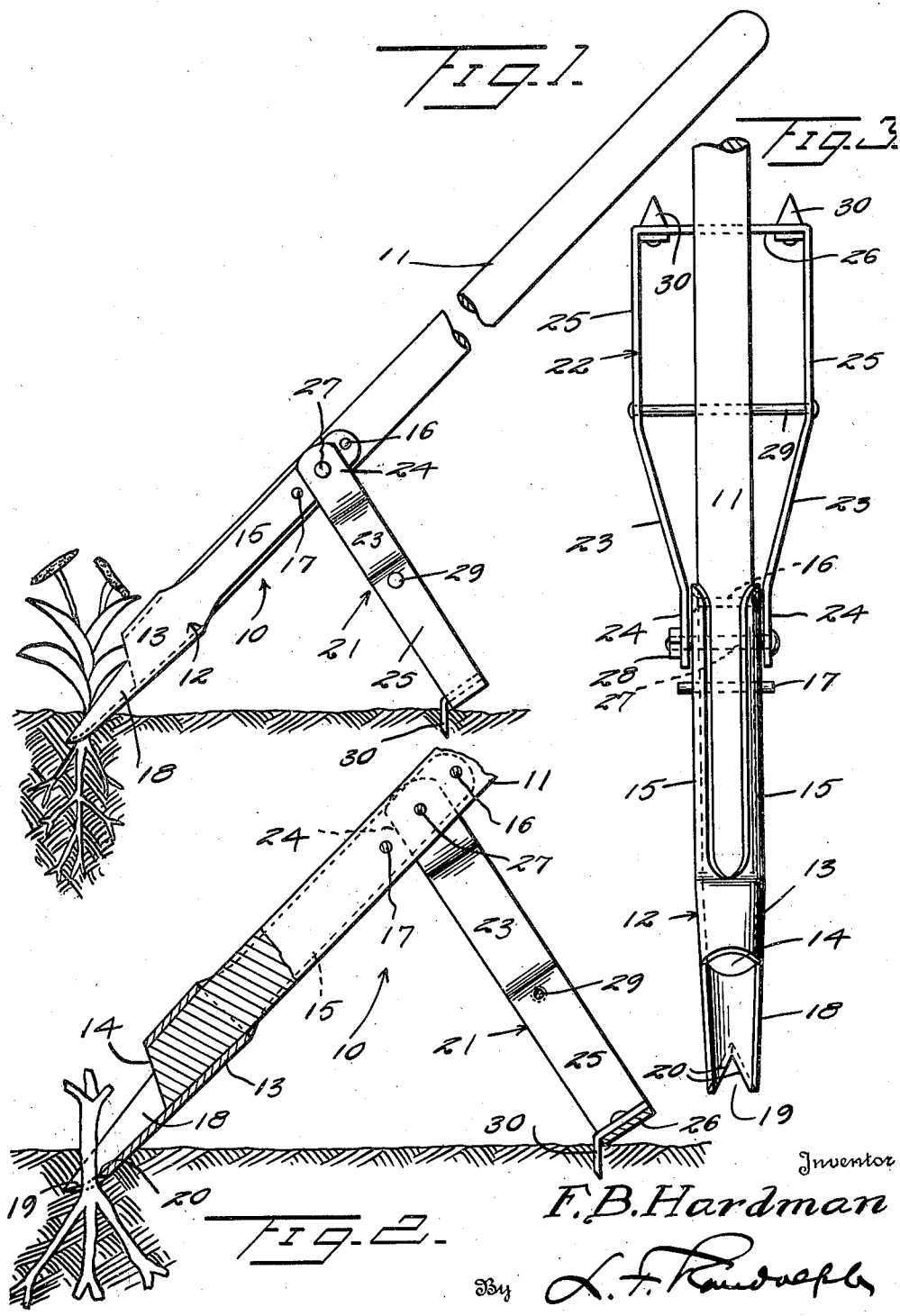

2,349,621

UNITED STATES PATENT OFFICE 2,349,621

LAWN WEEDER

French B. Hardman, Ashtabula, Ohio

Application January 8, 1942, Serial No. 426,076

2 Claims. (Cl. 254—132)

This invention relates to a weeder and more particularly to a weeder adapted to pull or extract weeds or undesirable plants such as dandelions or plantains from a lawn so that the roots will be extracted from the earth and will not continue to grow as frequently occurs wherein using other weeding tools the root is cut or broken off so that a portion thereof is left in the ground.

Still another aim of the invention is to provide a tool of very simple construction capable of being operated with a minimum of effort on the part of the operator and from a standing position and without stooping.

Still another aim of the invention is to provide a lawn weeder which will extract undesirable weeds or plants without digging a large unsightly hole in a lawn in order to fully extract the weed or plant root.

Other objects and advantages of the invention will hereinafter become more fully apparent from the following description of the drawing, which illustrates a preferred embodiment thereof, and wherein:

Figure 1 is a side elevational view showing the lawn weeder in an applied position, Figure 2 is an enlarged fragmentary longitudinal sectional view, partly in elevation, showing the headed end of the tool in its applied position, and Figure 3 is an enlarged fragmentary plan view showing the tool in an inoperative position and with the support disposed against the handle of the tool.

Referring more particularly to the drawing, wherein like reference characters designate like or corresponding parts throughout the different views, 10 designates generally the lawn weeder in its entirety and which includes an elongated tool handle 11, similar to a conventional hoe or rake handle. On one end of the handle 11 is mounted a head 12 which includes a socket portion 13 which engages the end 14 of the handle 11. The socket portion 13 is provided with corresponding straps 15 which project from one end thereof toward the opposite end of the handle 11 and which are outwardly bowed in cross section for fitting against a handle. A rivet 16 and a pin 17 extend through the handle 11 and the straps 15 for securing the head 12 to the handle.

The head 12 is provided with a blade 18 which forms an extension of the opposite end of the socket 13 and which projects outwardly from the handle end 14. The blade 18 is elongated and arcuately shaped in cross section and is tapered toward its free end and is substantially semi-circular in cross section at its inner end. An outwardly opening substantially V-shaped notch 19 is formed in the outer end of the blade 18 and the edges 20 thereof are beveled on the outer, convex side of the blade 18 to form sharpened cutting edges.

A support, designated generally 21, includes a substantially U-shaped bar 22, the legs of which are provided with converging portions 23 near their free ends for offsetting their terminals 24 inwardly of one another relatively to the portions 25 of the legs which project from the ends of the intermediate portion 26 of the bar 22. The terminals 24 are disposed on the outer sides of the straps 15 and a bolt 27 extends through the handle 11, the straps 15, and loosely through the terminals 24 for swingably mounting the support 21 on the handle 11. The bolt 27 is provided with a threaded end to receive a nut 28 which retains the terminals 24 in engagement with the bolt. The bolt 27 is disposed between the rivet 16 and the pin 17 and extends in substantially the same direction as the pin. As seen in Figure 3, the ends of the pin 17 project outwardly from the straps 15 for a purpose that will hereinafter be described. The legs of the bar 22 are connected intermediate of their ends by means of a rod 29 which holds the legs properly spaced relatively to one another. A plurality of claws 30 are secured to the inner side of the intermediate portion 26 at corresponding ends thereof. The claws 30 are provided with tapered free ends which project laterally from the same edge of the intermediate portion 26 and which are bent to project outwardly and at substantially an oblique angle to the longitudinal axis of the support 21, as best seen in Figures 1 and 2.

The pin 17 is disposed so that its projecting ends will be engaged by the legs of the bar 22 to limit the swinging movement of the free end of the support 21 in a direction toward the blade 18 so that when the ends of the pin 17 are engaged by the legs of the bar 22 the support will be projecting outwardly from the handle 11. This will be the position that the support 21 will normally assume when the tool 10 is in use, due to the fact that the blade 18 and the support 21 are disposed on the same side of the handle 11 as the convex or outer side of the blade 18 which forms its under side. Consequently, when the free end of the blade 18 is driven into the earth, as seen in Figures 1 and 2, to cause the notch 19 to engage around the root of a plant such as a dandelion or plantain, the support 21 will assume a position so that the claws 30 will penetrate the earth to cause the support to assume the position as seen in Figures 1 and 2. The blade 18 is pushed forwardly sufficiently so that its edges 20 will cut into the plant root enough to effectively grip it and the claws 30 will yield sufficiently in the earth to permit a sufficient rocking movement of the support 21 relatively to the earth, to allow the blade 18 to be thus advanced. By a downward pressure on the handle 11 at its opposite or upper end, the blade 18 will be swung upwardly by the handle 11 rocking on the support 21 at the pivot 27, to lift the plant upwardly to extract the root thereof from the earth. The claws 30 in addition to permitting the limited rocking movement of the support 21, relatively to the ground, will prevent the support from sliding relatively to the ground. When the tool 10 is not in use the support 21 is disposed against the handle 11, as seen in Figure 3, and extends in a direction away from the head 12.

Various modifications and changes are contemplated and may obviously be resorted to, provided they fall within the spirit and scope of the invention as hereinafter defined by the appended claims, as only a preferred embodiment thereof has been disclosed.

I claim as my invention:

1. A lawn weeder comprising a blade member having a socket portion, a blade portion extending from one end thereof, straps extending from the other end of the socket portion, a handle extending into the socket portion between the straps and extending beyond the free ends of the straps, a support device, and an element pivotally mounting the support device passing through the support device, straps and handle.

2. A lawn weeder according to claim 1 wherein said blade member is in one piece, and said socket portion extends approximately 360 deg. around the handle.

FRENCH B. HARDMAN.